(12) United States Patent
Hashizume et al.

(10) Patent No.: US 11,431,187 B2
(45) Date of Patent: *Aug. 30, 2022

(54) CONTROLLER OF HYBRID-TYPE ENGINE GENERATOR

(71) Applicant: Honda Motor Co., Ltd., Tokyo (JP)

(72) Inventors: Takashi Hashizume, Wako (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 17/042,168

(22) PCT Filed: Mar. 29, 2018

(86) PCT No.: PCT/JP2018/013449
§ 371 (c)(1),
(2) Date: Sep. 27, 2020

(87) PCT Pub. No.: WO2019/186962
PCT Pub. Date: Oct. 3, 2019

(65) Prior Publication Data
US 2021/0028643 A1    Jan. 28, 2021

(51) Int. Cl.
*H02J 7/00* (2006.01)
*H02J 7/14* (2006.01)
*H02J 7/24* (2006.01)
*H02M 3/335* (2006.01)

(52) U.S. Cl.
CPC .......... *H02J 7/1423* (2013.01); *H02J 7/0047* (2013.01); *H02J 7/24* (2013.01); *H02M 3/33569* (2013.01)

(58) Field of Classification Search
CPC .................................................... H02J 7/1423
USPC ........................................................ 320/128
See application file for complete search history.

(56) References Cited

U.S. PATENT DOCUMENTS

| 2009/0261599 A1* | 10/2009 | Alston ....................... H02P 9/04 290/40 B |
| 2018/0036823 A1* | 2/2018 | Meckler ............... B23K 9/1062 |
| 2021/0021218 A1* | 1/2021 | Kiyohiro ................... H02P 9/04 |
| 2021/0023961 A1* | 1/2021 | Kiyohiro ............... H02J 7/0048 |

FOREIGN PATENT DOCUMENTS

| JP | S60109728 A | 6/1985 |
| JP | H09298806 A | 11/1997 |
| JP | 2011234458 A | 11/2011 |
| JP | 2011234459 A | 11/2011 |
| JP | 2012080725 A | 4/2012 |
| JP | 2018026349 A | 2/2018 |

OTHER PUBLICATIONS

International Search Report; Application PCT/JP2018013449; dated Apr. 24, 2018.

\* cited by examiner

*Primary Examiner* — Yalkew Fantu
(74) *Attorney, Agent, or Firm* — Duft & Bornsen, PC

(57) ABSTRACT

The inverter generator controller equipped with the engine generator unit driven by the engine and operates to prompt user to specify the load to be used (S10); to respond to load specified by user in response to prompt by selecting and connect to the engine generator unit at least one among multiple batteries differing in discharge capacity per unit time (S12 to S22); and to control charge/discharge of the connected battery/batteries and operation of the engine generator unit based on load output demand from the specified load (S24).

5 Claims, 5 Drawing Sheets

FIG. 4

| COMBINATION OF BATTERY | MAJOR USAGE | ASSIST EXTENT | BATTERY DISCHARGE (IDLE STOP) | FUEL CONSUMPTION |
|---|---|---|---|---|
| RAPID + ORDINARY | GENERAL-TYPE LOAD (HOME APPLIANCES) | MEDIUM | YES | BETTER |
| RAPID + RAPID | TRANSIENT-TYPE LOAD (DRILLS, COMPRESSORS) | LARGE | NO (ECONOMICAL THROTTLE) | GOOD |
| ORDINARY + ORDINARY | STEADY-TYPE LOAD (LIGHTING FIXTURES) | SMALL | YES | BEST |

CONTROLLER OF HYBRID-TYPE ENGINE GENERATOR

TECHNICAL FIELD

This invention relates to a controller of a hybrid-type engine generator that is driven by a battery and an engine and incorporates an engine generator unit.

BACKGROUND ART

As a controller of a hybrid-type engine generator that is driven by a battery and an engine and incorporates an engine generator unit, the technology of Patent Document 1, for example, has been known. The technology of Patent Document 1 is adapted on the one hand to respond to battery output being of predetermined value or greater by holding engine speed constant to generate fixed power output while simultaneously making up for any shortfall with battery output and on the other hand to respond to battery output having fallen below predetermined value by gradually increasing engine speed to gradually increase generated power output while simultaneously decreasing battery output.

PRIOR ART DOCUMENTS

Patent Document

Patent Document 1: Japanese Unexamined Patent Publication No. 2011-234458A

SUMMARY OF THE INVENTION

Problem to be Solved by the Invention

Patent Document 1 adopts the aforesaid configuration in order to avoid noise increase by inhibiting engine speed increase. Although it is equipped with a battery, there is a room for further improving fuel consumption by a cooperative control of the battery and engine generator.

The present invention is therefore directed to providing a hybrid-type engine generator controller adapted to improve the cooperative control of the battery and engine generator so as to enhance fuel consumption.

Means for Solving the Problem

The invention provides a controller of the hybrid-type engine generator equipped with the engine generator unit driven by the engine comprising: a user prompting unit that prompts user to specify a load to be used; a battery connection unit that responds to load specified by user in response to prompt by selecting and connects to the engine generator unit at least one among multiple batteries differing in discharge capacity per unit time; and a control unit that controls charge/discharge of the connected battery/batteries and operation of the engine generator unit based on load output demand from the specified load.

BRIEF DESCRIPTION OF THE DRAWINGS

FIG. 4 is an explanatory diagram showing load types contemplated by the processing of FIG. 3, and FIGS. 5A to 5C are set of time charts for explaining the processing of FIG. 3.

MODE FOR CARRYING OUT THE INVENTION

A hybrid-type engine generator controller according to an embodiment of this invention is explained with reference to the attached drawings in the following.

Figure 1:
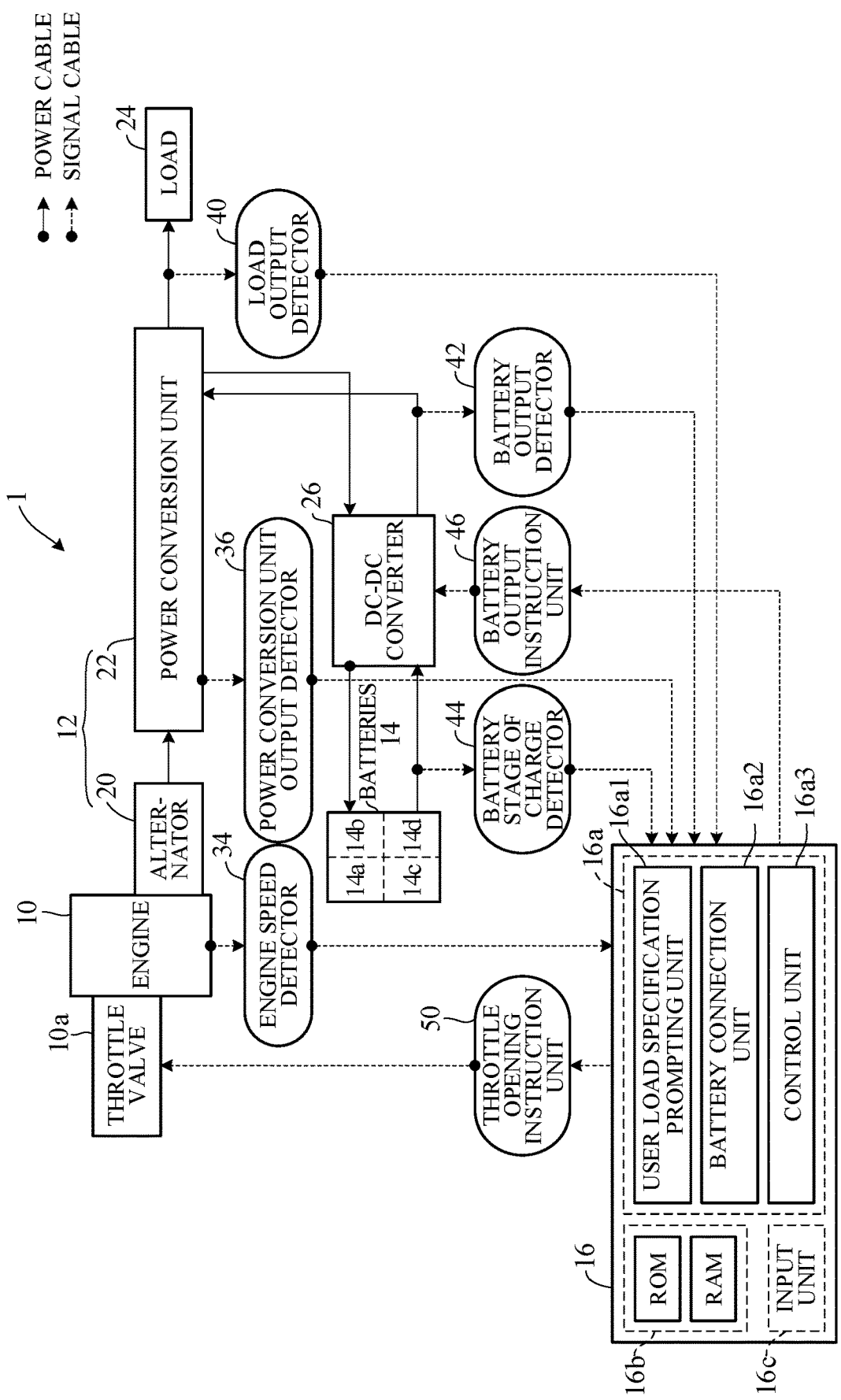
FIG. 1 is a schematic diagram generally illustrating a hybrid-type engine generator controller according to an embodiment of this invention.
Figure 2:
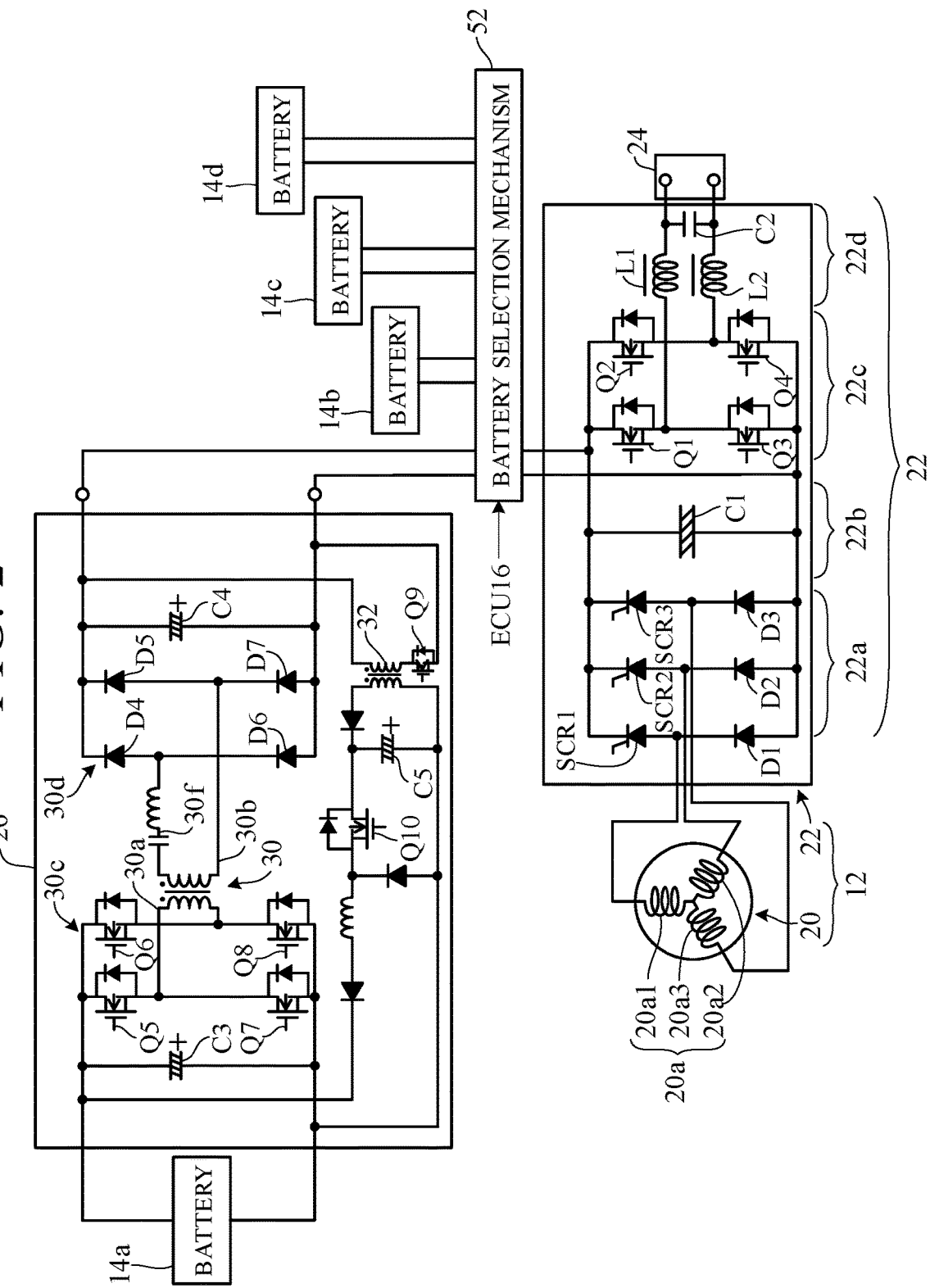
FIG. 2 is a circuit diagram showing structural details of an engine generator unit and other elements of FIG. 1.

FIG. 1 is a schematic diagram generally illustrating a hybrid-type engine generator controller according to an embodiment of this invention, and FIG. 2 is a circuit diagram showing structural details of an engine generator unit and other elements of FIG. 1.

As shown in FIG. 1, a hybrid-type engine generator (hereinafter sometimes called "generator") 1 comprises an engine 10, an engine generator unit 12 driven by the engine 10, a battery 14, and an electronic control unit (hereinafter sometimes called "ECU") 16 for controlling operation of these elements.

The Battery 14 comprises four batteries made of 14a, 14b, 14c and 14d. The four batteries 14 comprises batteries differing in discharge capacity per unit. Specifically, each of the batteries 14a, 14b has an ordinary discharge capacity (first characteristics), and each of the batteries 14c, 14d has a discharge capacity (second characteristics) that is marked by larger discharge capacity than the first characteristics. In other words, the second characteristics are characteristics that make rapid discharge. Since the four batteries are the same in configuration except for the discharge characteristics, they are simply explained as the battery 14.

The ECU 16 is a microcomputer including, inter alia, at least a processor (CPU) 16a and at least one memory (ROM, RAM) 16b connected to the processor 16a, and an input unit 16c equipped with keyboard and display.

The engine generator unit 12 is equipped with an alternator 20 and a power conversion unit 22. The engine 10 is, for example, a spark ignition, air cooled, gasoline fueled engine with pistons (not shown) that reciprocate inside cylinders and a crankshaft (output shaft; not shown) that rotates synchronously with the pistons. Rotation of the engine 10 is regulated by a throttle valve 10a driven by an actuator.

Motive power of the engine 10 is transmitted through the crankshaft to drive the alternator 20 of the engine generator unit 12. The alternator 20, which is of multipolar type, comprises a rotor (not shown) that is connected to and rotated integrally with the crankshaft and is provided with permanent magnets therearound and a stator (not shown) that is arranged concentric with the rotor to face a peripheral surface thereof and is provided with UVW windings 20a arranged at phase angles of 120 degrees as shown in FIG. 2.

As shown in FIG. 2, the power conversion unit 22 comprises a rectifier 22a, a direct current unit 22b, an inverter 22c and a wave shaping circuit 22d.

The rectifier 22a is constituted of a hybrid bridge rectifier circuit comprising bridge connected thyristors SCR1, SCR2 and SCR3 and diodes D1, D2 and D3.

Among the three phase windings 20a of the alternator 20, U phase component 20a1 is connected to the junction between SCR1 and D1, V phase component 20a2 is connected to the junction between SCR2 and D2, and W phase component 20a3 is connected to the junction between SCR3 and D3.

The rectifier 22a rectifies output of the alternator 20 and sends the rectified output to the direct current unit 22b and also functions as drive means responsive to ON-OFF switching of SCR1 to SCR3 by the ECU 16 for converting DC output voltage from the battery 14 to three phase AC voltage applied to the alternator 20. The direct current unit 22b is formed by a capacitor C1.

The inverter 22c comprises bridge-connected switching elements Q1, Q2, Q3 and Q4 and diodes connected in parallel with the switching elements. Output of the inverter 22c is input to the wave shaping circuit 22d comprising coils L1 and L2 and a capacitor C2. The stage following the wave shaping circuit 22d is a load (electrical load) 24.

The battery 14 is connected to the power conversion unit 22 through an isolated DC-DC converter 26.

The DC-DC converter 26 supplies power both ways between the battery 14 and the direct current unit 22b. The DC-DC converter 26 corresponds to the charging power converter and the output power converter indicated in FIG. 1.

The DC-DC converter 26 is equipped with a primary side low-voltage side winding 30a and a secondary side high-voltage side winding 30b of a transformer 30 and with a low-voltage side switching unit 30c connected to the low-voltage side winding 30a and a rectifier 30d connected to the high-voltage side winding 30b.

The low-voltage side switching unit 30c comprises bridge-connected switching elements Q5, Q6, Q7 and Q8 and diodes connected in parallel with the switching elements. The rectifier 30d comprises bridge-connected diodes D4, D5, D6 and D7.

The high-voltage side winding 30b incorporates an LC resonant circuit 30f and smoothing capacitors C3 and C4 are connected to the low-voltage side switching unit 30c and the rectifier 30d. Switching elements Q5 to Q8 of the low-voltage side switching unit 30c are ON-OFF controlled by the ECU 16.

A charging circuit is formed on input-output sides of a second transformer 32. The charging circuit comprises a switching element Q9 provided on input side of the second transformer 32 and a capacitor C5 and switching element Q10 provided on output side thereof. The ECU 16 ON-OFF controls the switching element Q9 to store DC voltage in the capacitor C5 and adjusts the stored voltage to a value suitable for charging the battery 14 by ON-OFF controlling the switching element Q10.

The ECU 16 synchronously drives the switching elements so that the DC-DC converter 26 performs power conversion in both directions.

In the illustrated configuration, therefore, when residual charge of the battery 14 is below predetermined value and generated power output of the engine generator unit 12 is adequate, output voltage of the direct current unit 22b is stepped up by the DC-DC converter 26 and input to the battery 14 (to charge the battery 14), while when residual charge of the battery 14 is high, output voltage of the direct current unit 22b augments (assists) output voltage of the engine generator unit 12, whereby power is supplied from the battery 14 to the load 24 via the DC-DC converter 26, the inverter 22c and the wave shaping circuit 22d.

In the power conversion unit 22, output voltage of the rectifier 22a is smoothed and adjusted by the direct current unit 22b, converted to AC power of predetermined frequency by the inverter 22c as elaborated later, and supplied to the load 24 through the wave shaping circuit 22d.

An engine speed detector 34 constituted of a magnetic pickup or the like provided in the engine 10, specifically near the stator of the alternator 20, detects rotational speed of the engine 10 commensurate with rotor rotational speed, and a power conversion unit output detector 36 constituted of a voltage-amperage sensor or the like provided in the power conversion unit 22 detects, inter alia, inter-terminal voltage of the capacitor C1 of the direct current unit 22b and generated power output of the engine generator unit 12.

A load output detector 40 constituted of a voltage-amperage sensor or the like provided upstream of the load 24 detects output required by the load 24.

A battery output detector 42 constituted of a voltage-amperage sensor or the like provided downstream of the DC-DC converter (output power converter) 26 detects power output (discharged) from the battery 14, and a battery state of charge detector 44 constituted of a voltage-amperage sensor or the like suitably installed at the battery 14 detects state of charge (SOC) of the battery 14.

Moreover, a battery output instruction unit 46 that instructs output (discharge) of the battery 14 is provided in the DC-DC converter (output power converter) 26.

An actuator of the throttle valve 10a of the engine 10 is connected to a throttle opening instruction unit 50 and opening-closing of throttle valve 10a is adjusted to correct throttle opening by driving the actuator in accordance with output of the throttle opening instruction unit 50.

Outputs of the aforesaid detectors are inputted to the ECU 16. The ECU 16 controls inter-terminal voltage of the capacitor C1 detected in the engine generator unit 12 to constant value irrespective of increase-decrease of load 24 and ON-OFF controls the switching elements Q5 to Q8 so that AC power output from the inverter 22c matches load output demand from (output required by) the load 24 at desired frequency.

Based on the received sensor outputs, the ECU 16 also operates through the battery output instruction unit 46 to instruct battery 14 output (discharge) and operates through the throttle opening instruction unit 50 to adjust throttle opening and control engine speed.

Moreover, as discussed later, the processor 16a in the ECU 16 operates in accordance with a program stored in the memory 16b to function as a user load specification prompting unit 16a1 that prompts user to specify load 24 (i.e., type of load) to be used, a battery connection unit 16a2 that responds to (type of) load 24 specified by user in response to prompt by selecting and connects to the engine generator unit 12 at least one among multiple (4) batteries differing in discharge capacity per unit time, and a control unit 16a3 that controls charge/discharge of the connected battery/batteries 14 and operation of the engine generator unit 12 based on load output demand from (required by) specified load. In other words, a configuration is adopted whereby user is prompted to specify the load 24 to be used, at least one battery is selected, in accordance with load 24 specified by user in response to prompt, from among multiple batteries differing in discharge capacity per unit time, and charge/discharge of the selected battery/batteries 14 and operation of the engine generator unit 12 are controlled based on load output demand from (required by) specified load.

As shown in FIG. 2, the batteries 14a, 14b, 14c and 14d are connected in parallel to the DC-DC converters 26 through a battery selection mechanism 52. The battery selection mechanism 52 is provided at output terminals of the DC-DC converters 26 and is equipped with a switch (not shown) openable/closeable by the ECU 16, specifically by the battery connection unit 16a2, in a configuration that enables one to four of the batteries 14a, 14b, 14c and 14d to be selected by operation of the battery connection unit 16a2.

Figure 3:
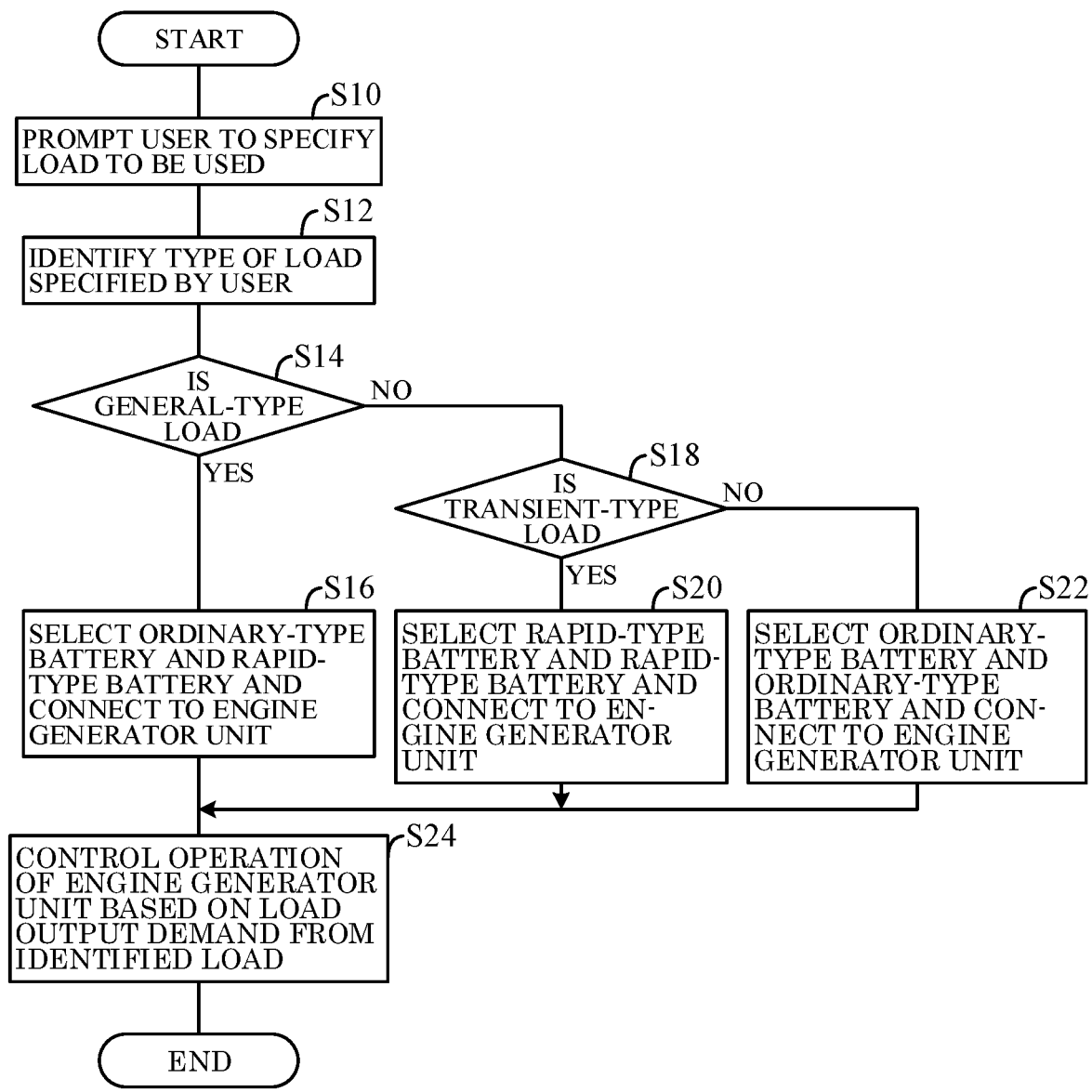
FIG. 3 is a flowchart showing operation of the engine generator controller of FIG. 1.

FIG. 3 is a flowchart showing operation of a controller of the engine generator 1, specifically operation of the ECU 16. in accordance with an embodiment, FIG. 4 is an explanatory diagram showing load types contemplated by the processing of FIG. 3, and FIGS. 5A to 5C are time charts for explaining the processing of FIG. 3.

Now to explain with reference to FIG. 3, in S10 user is prompted to utilize the input unit 16c to specify the (type of) load 24 to be used (S: processing Step).

Next, regarding the types of load 24, as shown in FIG. 4, this embodiment envisions three type of loads: general-type load, transient load and steady load. General-type load means load whose output demand changes moderately (with medium battery assist) like that of commercial home appliances and similar, transient load means load whose output demand changes rapidly (with high battery assist) like that of electric drills, compressors and similar, and steady load means load whose output demand changes minimally (with low battery assist) like that of lighting fixtures and similar.

Moreover, as stated earlier, the batteries 14 include four batteries, namely, the batteries 14a and 14b having ordinary discharge characteristics (first characteristics) and hereinafter referred to as "ordinary-type", and the batteries 14c and 14d having discharge capacity (second characteristics) larger than the first characteristics and hereinafter referred to as "rapid-type".

Returning to the explanation of the FIG. 3 flowchart, next in S12, type among those listed above of the load 24 that user specified by operating the input unit 16c is identified, whereafter the program goes to S14 to determine whether the type-identified load 24 is a general-type load, and when the result is YES, to S16 to select one ordinary-type 14a and one rapid-type 14c as batteries to be connected to the engine generator unit 12.

On the other hand, when the result in S14 is NO, the program goes to S18 to determine whether the type-identified load 24 is a transient load, and when the result is YES, to S20 to select the rapid-types 14c and 14d as two batteries 14 to be connected to the engine generator unit 12.

Further, when the result in S18 is NO, as this means that the type-identified load 24 is a steady load, the program goes to S22 to select the ordinary-types 14a and 14b as batteries to be connected to the engine generator unit 12.

In this embodiment, four batteries 14a, 14b, 14c and 14c are kept on hand in advance and a configuration is adopted whereby these available batteries are selected/connected in accordance with the load specified by user. However, this invention is not limited to this arrangement and it is alternatively possible to deal with the type of load specified by user by fetching batteries from a stockroom or other storage place or by purchasing them on the market and to connect the so-acquired batteries to the DC-DC converters 26 via the battery selection mechanism 52.

Next, in S24, the DC-DC converters 26 are individually controlled for the batteries selected from among 14a, 14b, 14c and 14c based on load output demand from (required by) the identified load 24, and operation of the engine generator unit 12 is controlled.

The processing of S24 is explained below with reference to FIGS. 5A to 5C.

Figure 5A:
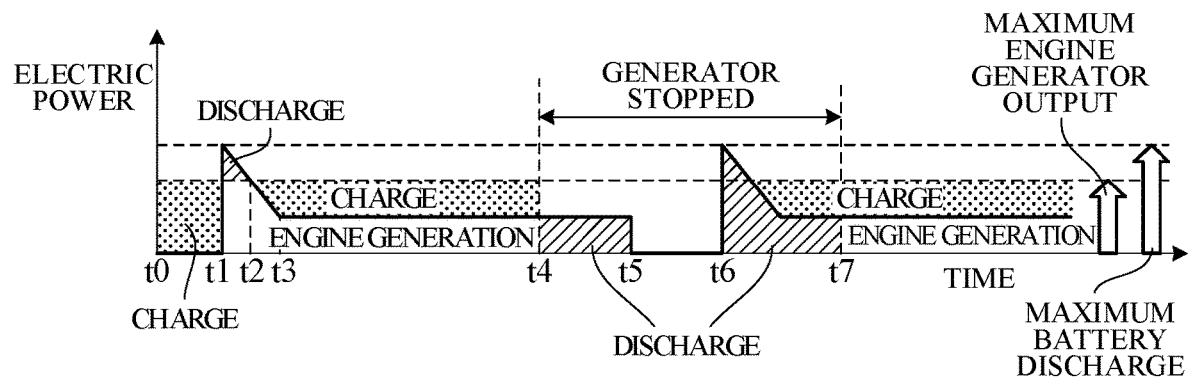

FIG. 5A relates to a case of using ordinary-type battery 14a and rapid-type battery 14c to control a general-type load 24.

In the case of FIG. 5A, since load output demand from (required by) identified load 24 is zero from time t0 to time t1, the ECU 16 individually controls the DC-DC converters 26 of the batteries 14a and 14c to charge the batteries 14a and 14c with generated power output of the engine generator unit 12.

Since load output demand then rises sharply from zero to maximum load state at time t1, generated power output of the engine generator unit 12 is maximized and power shortfall is covered by individually controlling the DC-DC converters 26 to discharge power from the batteries 14a and 14c, whereafter discharge is gradually reduced and then terminated at time t2 in response to decreasing load output demand, whereafter only generated power of the engine 10 is outputted.

Generated power output is gradually reduced from time t2 to t3 down to medium level matched to load output demand at time t3, and surplus power is charged. At time t4, the generator 1 is stopped (idle stopped), power is discharged from the batteries 14a and 14c, and this is continued up to time t5.

After falling to zero at time t5, load output demand rises to high level at time t6, so power matched to load output demand is discharged from the batteries 14a and 14c with the generator 1 kept stopped. Next, at time t7, the generator 1 is restarted to generate power from the engine generator unit 12.

Therefore, as shown in FIGS. 2 and 5A, generated power output of the engine generator unit 12 and charge/discharge of the batteries 14 are smoothed. In addition, the two batteries 14a and 14c are enabled to help cover any rapid increase in load output demand, favorable coordinate control of the generator 1 and the batteries 14 is achieved, and fuel efficiency of the generator 1 is improved.

Figure 5B:
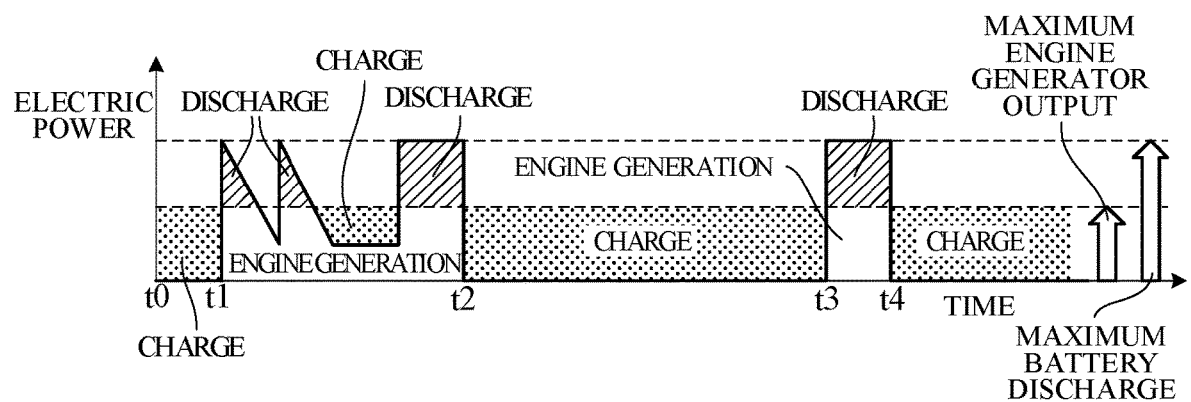

FIG. 5B relates to a case of using rapid-type batteries 14c and 14d to control a transient load 24.

In the case of FIG. 5B, since load output demand from (required by) load 24 is zero from time t0 to time t1, the ECU 16 individually controls the DC-DC converters 26 of the batteries 14c and 14d to charge the batteries 14c and 14d with generated power output.

Since load output demand then rises sharply at time t1, generated power output of the engine generator unit 12 is maximized and power shortfall is covered by individually controlling the DC-DC converters 26 to discharge power from the batteries 14c and 14d, with such battery assist being intermittently performed in accordance with increase/decrease of load output demand.

Since load output demand becomes zero at time t2, the batteries 14c and 14d are charged with power generated by the engine generator unit 12, power shortfall with respect to load output demand between time t3 and t4 is covered by battery discharge assist, and the batteries 14c and 14d are charged with generated power after load output demand becomes zero at time t4.

Therefore, since amount of battery assist increases as shown in FIGS. 4 and 5B, smoothness of power generation by the engine generator unit 12 and charge/discharge of the batteries 14 decreases compared to that in FIG. 5A, but voltage decrease is mitigated, favorable coordinate control is achieved, and fuel efficiency is improved to some extent.

Figure 5C:
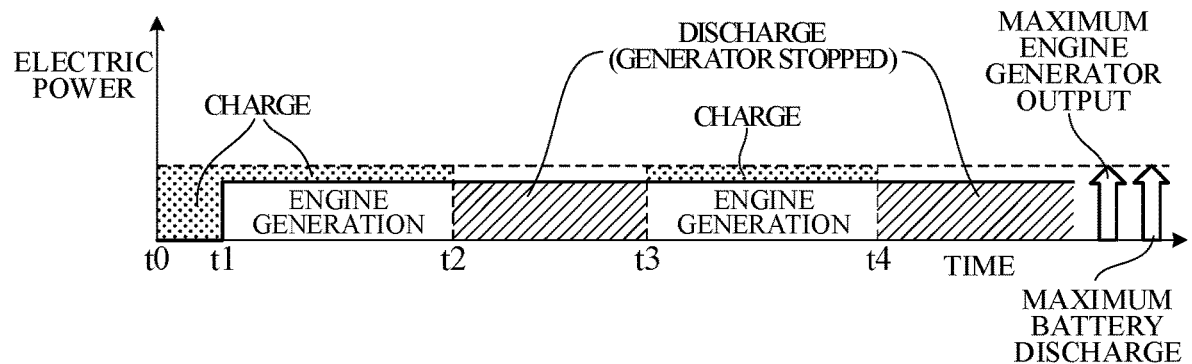

FIG. 5C relates to a case of using ordinary-type batteries 14a and 14b to control a steady load 24.

In the case of FIG. 5C, since load output demand from (required by) load 24 is zero from time t0 to time t1, the ECU 16 individually controls the DC-DC converters 26 of the batteries 14a and 14b to charge the batteries 14a and 14b with generated power output.

Next, rise in load output demand at time t1 is met with power generated by the engine generator unit 12 and the DC-DC converters 26 are individually controlled to charge the batteries 14*a* and 14*b* with surplus power.

Next, battery discharge is implemented at time t2, power generation by the engine generator unit 12 at time t3, battery discharge again at time t4, and so on in alternate repetition of the two modes.

As a result, as shown in FIGS. 4 and 5C, power generated by the engine generator unit 12 and charge/discharge power of the batteries 14 are optimally smoothed, optimum coordinate control is achieved, and fuel economy is markedly improved by increasing battery discharge to achieve ecological running.

In the embodiment shown in FIGS. 3 to 5, the number of batteries 14 connected/disconnected in response to load is two, but this is not a limitation and the number of such batteries can optionally be one, three or greater. Namely, the characterizing feature of this embodiment lies in selecting in accordance with load and connecting to the engine generator unit 12 at least one among multiple batteries differing in discharge capacity per unit time, so that the number of selected/connected batteries 14 suffices so long as at least one.

As described in the foregoing, this embodiment is configured such that, the controller of the hybrid-type engine generator 1 equipped with the engine generator unit 12 driven by the engine 10 comprise: the user load specification prompting unit (16*a*1, 16*c*, S10) that prompts user to specify the load 24 to be used; the battery connection unit (16*a*2, 50, S12 to S22) that responds to load 24 specified by user in response to prompt by selecting and connects to the engine generator unit 12 at least one among multiple batteries 14 (14*a*, 14*b*, 14*c*, 14*d*) differing in discharge capacity per unit time; and the control unit (16*a*3, S24) that controls charge/discharge of the connected battery/batteries 14 and operation of the engine generator unit 12 based on load output demand from (required by) the specified load 24, whereby coordinate control of the engine generator 1 (engine generator unit 12) and the battery/batteries 14 can be enhanced and fuel efficiency upgraded.

In addition, the multiple batteries 14 are configured to comprise the batteries 14*a* and 14*b* whose discharge capacity per unit time exhibits first characteristics (ordinary characteristics) and the batteries 14*c* and 14*d* whose discharge capacity per unit time exhibits second characteristics (rapid characteristics) marked by larger discharge capacity than the first characteristics, whereby coordinate control of the engine generator 1 (engine generator unit 12) and the batteries 14 can be readily enhanced and fuel economy easily improved.

Moreover, the battery connection unit is configured to respond to the load specified by user in response to the prompt by connecting to the engine generator unit at least two batteries selected from among the multiple batteries kept on hand in advance, whereby coordinate control of the engine generator 1 (engine generator unit 12) and the battery/batteries 14 is surely improved and fuel efficiency aptly upgraded.

As described in the foregoing, this embodiment is configured such that, the control method of the hybrid-type engine generator 1 equipped with the engine generator unit 12 driven by the engine 10 comprise: the user load specification prompting step (S10) that prompts user to specify the load 24 to be used; the battery connection step (S12 to S22) that responds to load 24 specified by user in response to prompt by selecting and connects to the engine generator unit 12 at least one among multiple batteries 14 (14*a*, 14*b*, 14*c*, 14*d*) differing in discharge capacity per unit time; and the control step (S24) that controls charge/discharge of the connected battery/batteries 14 and operation of the engine generator unit 12 based on load output demand from (required by) the specified load 24, whereby coordinate control of the engine generator 1 (engine generator unit 12) and the battery/batteries 14 can be enhanced and fuel efficiency upgraded.

In addition, the multiple batteries 14 are configured to comprise the batteries 14*a* and 14*b* whose discharge capacity per unit time exhibits first characteristics (ordinary characteristics) and the batteries 14*c* and 14*d* whose discharge capacity per unit time exhibits second characteristics (rapid characteristics) marked by larger discharge capacity than the first characteristics, whereby coordinate control of the engine generator 1 (engine generator unit 12) and the batteries 14 can be readily enhanced and fuel economy easily improved.

Moreover, the battery connection step is configured to respond to the load specified by user in response to the prompt by connecting to the engine generator unit at least two batteries selected from among the multiple batteries kept on hand in advance, whereby coordinate control of the engine generator 1 (engine generator unit 12) and the battery/batteries 14 is surely improved and fuel efficiency aptly upgraded.

As described in the foregoing, this embodiment is configured such that, the controller of the hybrid-type engine generator 1 equipped with the engine generator unit 12 driven by the engine 10 comprise: the ECU 16 including, inter alia, at least a processor 16*a* and at least one memory 16*b* connected to the processor 16*a* so that the processor 16*a* in the ECU 16 operates in accordance with a program stored in the memory 16*b* to function to prompt user to specify the load 24 to be used (S10); to respond to load 24 specified by user in response to prompt by selecting and connects to the engine generator unit 12 at least one among multiple batteries 14 (14*a*, 14*b*, 14*c*, 14*d*) differing in discharge capacity per unit time (S12 to S22); and to control charge/discharge of the connected battery/batteries 14 and operation of the engine generator unit 12 based on load output demand from (required by) the specified load 24 (S24), whereby coordinate control of the engine generator 1 (engine generator unit 12) and the battery/batteries 14 can be enhanced and fuel efficiency upgraded.

In addition, the multiple batteries 14 are configured to comprise the batteries 14*a* and 14*b* whose discharge capacity per unit time exhibits first characteristics (ordinary characteristics) and the batteries 14*c* and 14*d* whose discharge capacity per unit time exhibits second characteristics (rapid characteristics) marked by larger discharge capacity than the first characteristics, whereby coordinate control of the engine generator 1 (engine generator unit 12) and the batteries 14 can be readily enhanced and fuel economy easily improved.

Moreover, the processor 16*a* is configured to respond to the load specified by user in response to the prompt by connecting to the engine generator unit at least two batteries selected from among the multiple batteries kept on hand in advance, whereby coordinate control of the engine generator 1 (engine generator unit 12) and the battery/batteries 14 is surely improved and fuel efficiency aptly upgraded.

INDUSTRIAL APPLICABILITY

The inverter generator controller according to this invention can be optimally utilized in power generators driven by an engine.

DESCRIPTION OF SYMBOLS

1 engine generator, 10 engine, 14 battery, 16 electronic control unit (ECU), 16$a$ processor, 16$a$1 user load specification prompting unit, 16$a$2 battery connection unit, 16$a$3 control unit, 16$b$ memory, 16$c$ input unit, 20 alternator, 22 power conversion unit, 22$a$ rectifier, 22$b$ direct current unit, 22$c$ inverter, 22$d$ wave shaping circuit, 24 load, 26 DC-DC converter, 30 transformer, 32 second transformer, 34 engine speed detector, 36 power conversion unit output detector, 40 load output detector, 42 battery output detector, 44 battery stage of charge detector, 46 battery output instruction unit, 50 throttle opening instruction unit.

The invention claimed is:

1. A controller of a hybrid-type engine generator equipped with an engine generator unit driven by an engine, comprising:
    a user prompting unit that prompts a user to specify a type of load to be used;
    a battery connection unit that responds to the type specified by the user in response to the prompt and connects to the engine generator unit at least one among multiple batteries differing in discharge capacity per unit time; and
    a control unit that controls charge/discharge of the connected battery/batteries and operation of the engine generator unit based on load output demand from the load, wherein,
    the type includes a first type, a second type in which a change in the load output demand from the load is more rapid than the first type, and a third type in which the change in the load output demand from the load is less than the first and second types, and
    the battery connection unit is configured to respond to the type specified by the user in response to the prompt by connecting to the engine generator unit at least two batteries selected from among the multiple batteries kept on hand in advance.

2. The controller according to claim 1, wherein the multiple batteries are configured to comprise the batteries whose discharge capacity per unit time exhibits first characteristics and the batteries whose discharge capacity per unit time exhibits second characteristics marked by larger discharge capacity than the first characteristics.

3. The controller according to claim 2, wherein the battery connection unit is configured to, when the type specified by the user in response to the prompt is the second type, connect to the engine generator unit at least two batteries whose discharge capacity exhibits the second characteristics selected from among the multiple batteries, when the type specified by the user in response to the prompt is the third type, connect to the engine generator unit at least two batteries whose discharge capacity exhibits the first characteristics selected from among the multiple batteries, and when the type specified by the user in response to the prompt is the first type, connect to the engine generator unit at least one battery whose discharge capacity exhibits the first characteristic and one battery whose discharge capacity exhibits the second characteristic selected from among the multiple batteries.

4. The controller according to claim 1, further comprising
    a battery selection mechanism arranged between the multiple batteries and the engine generator unit and having a switch allowing selection of a battery to be connected to the engine generator unit from the multiple batteries, wherein
    the battery connection unit opens and closes the switch of the battery selection mechanism to response to the type specified by the user in response to the prompt by connecting to the engine generator unit the batteries selected from among the multiple batteries.

5. The controller according to claim 1, wherein the multiple batteries are the same in configuration except for a discharge characteristic.

\* \* \* \* \*